(12) United States Patent
Dittmar et al.

(10) Patent No.: US 10,899,173 B2
(45) Date of Patent: Jan. 26, 2021

(54) BEARING ASSEMBLY

(71) Applicant: Aktiebolaget SKF, Gothenburg (SE)

(72) Inventors: Rico Dittmar, Schweinfurt (DE); Roderich Schultze, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/530,635

(22) Filed: Aug. 2, 2019

(65) Prior Publication Data

US 2020/0047550 A1    Feb. 13, 2020

(30) Foreign Application Priority Data

Aug. 10, 2018   (DE) .................. 10 2018 213 525

(51) Int. Cl.
    *F16C 19/14*  (2006.01)
    *B60B 27/00*  (2006.01)

(52) U.S. Cl.
    CPC ...... *B60B 27/0005* (2013.01); *B60B 27/0073* (2013.01); *F16C 19/14* (2013.01); *F16C 2326/02* (2013.01)

(58) Field of Classification Search
    CPC ............. B60B 27/0005; B60B 27/0073; F16C 19/386; F16C 19/586; F16C 33/6611; F16C 33/6648; F16C 2326/02
    See application file for complete search history.

(56) References Cited

U.S. PATENT DOCUMENTS

| | | | | |
|---|---|---|---|---|
| 2,135,477 A | * | 11/1938 | Griswold | F16C 19/56 184/6.12 |
| 4,472,004 A | * | 9/1984 | Fingerle | F16C 33/6607 384/286 |
| 5,391,004 A | * | 2/1995 | Matczak | B60B 27/001 384/477 |
| 5,658,053 A | * | 8/1997 | Vencill | B60B 7/002 301/105.1 |
| 6,024,417 A | * | 2/2000 | Jones, II | F16C 19/548 301/124.1 |
| 2007/0075581 A1 | * | 4/2007 | Slesinski | F16C 33/6614 301/124.1 |
| 2014/0363113 A1 | * | 12/2014 | Katsaros | F16C 33/6648 384/469 |

* cited by examiner

*Primary Examiner* — Phillip A Johnson
(74) *Attorney, Agent, or Firm* — J-TEK Law PLLC; Scott T. Wakeman; Mark A. Ussai (57) ABSTRACT

A bearing assembly configured to rotationally support a first component relative to a second component includes at least one bearing and at least one closure element configured to close an opening in the first component, which opening is disposed axially adjacent to the bearing. The closure element may be a cured body of foam that conforms to the shape of the opening or a ring mounted on the first component such that it covers the opening.

16 Claims, 5 Drawing Sheets

BEARING ASSEMBLY

CROSS-REFERENCE

This application claims priority to German patent application no. 10 2018 213 525.8 filed on Aug. 10, 2018, the contents of which are fully incorporated herein by reference.

TECHNOLOGICAL FIELD

Exemplary embodiments relate to a bearing assembly that is configured to rotatably support a first component with respect to a second component.

BACKGROUND

For various reasons, components that are rotatably supported relative to bearing assemblies can include openings, undercuts, or cavities. For example, for weight reduction, wheel hubs often include undercuts and cavities on an inner contour. If the wheel bearings are lubricated, a lubricant can enter into these cavities. Since the lubricant is located in the cavity, it is then not available for lubricating the bearings or seals of the bearing assembly. This effect can be increased in particular in the case of components that rotate. In order to nonetheless maintain sufficient lubrication, in some bearing assemblies very high amounts of lubricant are introduced into the bearing assembly. This can lead on the one hand to a very high lubricant demand. On the other hand the lubricant may not be located in the regions wherein it is needed. This is undesirable.

Furthermore dirt that is present in the cavity may be washed out of the cavity by the lubricant. The dirt may comprise contaminants that have collected in the hub or in the opening during manufacturing. In one operation it can then occur that the contaminants enter into the bearing or a seal on the bearing assembly via the lubricant or the contaminated lubricant. Under unfavorable circumstances this can lead to the failure of the bearing assembly or of the seal. This is also undesirable.

This effect, that the lubricant is not available for bearing lubrication because it is thrown into openings of the components to be supported, or that dirt is located in the opening, can also occur in applications other than wheel hubs, for example, in housings, shafts, or the like.

There is therefore a need to provide a bearing assembly having an improved lubrication for its bearings. This need is met by a bearing assembly according to the disclosure.

Exemplary embodiments relate to a bearing assembly that is configured to rotatably support a first component with respect to a second component. For this purpose the bearing assembly comprises at least one bearing and at least one closure element. The closure element is configured to close an opening in the first component, which opening is disposed axially adjacent to the bearing. In some exemplary embodiments, since the opening is closed via the closure element, a lubricant can be prevented from collecting in the opening. A lubricant quantity can thus be reduced, for example. In some exemplary embodiments it may be possible for contaminants, dirt, or residues to be washed-out from the opening via the lubricant and reach into the bearing.

Here two components that are rotatably supported with respect to each other can be disposed, for example, coaxially to each other, and perform a relative movement with respect to each other about a common axis of rotation. Here, for example, a radially outer-lying component can be fixed and a radially inner-lying component can be movable. In other exemplary embodiments the radially outer-lying component can be movable and the radially inner-lying component can be fixed. Additionally or alternatively, both components can also move in the same direction but at different speeds or in opposite directions. The first component can be, for example, a housing or a hub, for example, a wheel hub or the like. The second component can be, for example, a shaft, an axle, or the like. For example, a rolling-element or a plain bearing can be used as a bearing. All possible rolling-element bearings, for example, tapered roller bearings, cylindrical roller bearings, ball bearings, or the like, can be used as rolling-element bearings. The opening can be, for example, an undercut, a cavity, a trough, a recess, a groove, or the like in the first component. For example, the first component can be the radially outer-lying, but also the radially inwardly disposed component. The opening can be, for example, a groove encircling in the circumferential direction. In some exemplary embodiments the opening can be provided in order to reduce a weight of the first component. For example, the opening can have an extension in the axial direction that corresponds to at least an axial extension of a bearing of the bearing assembly, for example, at least 0.2, 0.5, 1, 1.5, or 2 times an axial extension of the bearing. Viewed from a surface the opening can have a depth in the radial direction that corresponds to at least 10%, 20%, 30%, 40%, or 50% of a maximum radial extension of the first component in a region where the opening is disposed. The opening can be, for example, only one opening that is bounded in the radial direction by a material of the first component.

The closure element can be, for example, any component or material that is configured to reduce or even to prevent an entry of a lubricant into the opening. For example, the closure element can be manufactured from a different material than the first component. The closure element can be manufactured, for example, from a material having a lower density than the first component or the lubricant. Additionally or alternatively the closure element can also have a lower weight than an amount of lubricant, or material of the first component that could be received in the opening. In some exemplary embodiments the closure element can fill the opening in large part, for example, more than 50%, 60%, 70%, 80%, 90%, 95%, 99%, or even completely. In other exemplary embodiments the closure element can close the opening from outside; the opening remains as a cavity. A closing of the opening by the closure element can be present, for example, when the entry of the lubricant into the opening is reduced at least by 50%, 60%, 70%, 80%, 90%, 99%, or even completely prevented. The lubricant can be, for example, a liquid medium, for example, an oil, or, however, also a pasty medium, for example, a lubricating grease. In some exemplary embodiments the bearing assembly can be pre-filled with the lubricant, or the lubricant can be introduced into the bearing assembly during an operation, for example, at intervals.

In addition the bearing assembly can comprise a second bearing. The opening can then be disposed between the first bearing and the second bearing in the axial direction. In some exemplary embodiments the first and the second bearing can be tapered roller bearings that are disposed in a back-to-back arrangement with respect to each other.

Additionally or alternatively the first component can be a cast component. In some exemplary embodiments, due to the presence of the closure element, the first component can at least reduce or even completely prevent contaminants from the cast component manufacturing entering into the bearing. In some exemplary embodiments the closure element can be attached directly to the casting surface. In other exemplary embodiments a surface of the first component, on which the closure element is disposed, can be machined. In some exemplary embodiments a better seal behavior can be made possible, for example, when the closure element is attached in an interference- and/or friction-fit manner. Additionally or alternatively the first component can respectively include a bearing seat for the bearing. The bearing seat can be produced in the cast component, for example, by a machining method.

Additionally or alternatively the first component can be a wheel hub, and the second component can be an axle. In some exemplary embodiments a lubricant demand in wheel hubs can thereby be significantly reduced. In addition it can possibly be ensured that the lubricant is not thrown into radially outer-lying openings by centrifugal forces such that it is then not available in sufficient quantities in the bearings. In other words, in some exemplary embodiments a dry running of the bearings or of the seal can be avoided or a lubricant quantity can simply be reduced while still providing sufficient lubrication.

Additionally or alternatively the closure element can terminate flush with a surface that is directed in the radial direction, on which surface the opening is located. In some exemplary embodiments it can thus be made possible that a sufficient lubricant exchange and possibly a trouble-free assembly is possible radially inside the closure element and in the axial direction between the bearings. In other words the closure element can be spaced from the second component in the radial direction, or a distance between the first and second component can be not reduced or only minimally reduced, for example, by less than 10%, 5%, or 2%.

Alternatively the closure element can also be configured to delimit in the axial direction a space for the lubricant that can also be referred to as lubricating medium. In some exemplary embodiments, for example, when a lubricating grease is used as lubricant, but also when oil is used as lubricant, a required amount of lubricant can thereby be even further reduced. For this purpose the closure element can be disposed, for example, adjacent in the axial direction to the at least one bearing, or in the case of two bearings, between the two bearings in the axial direction, and represent a boundary for the lubricant. In some exemplary embodiments lubricant or at least a partial quantity of the lubricant can be prevented from flowing into a space that is located axially between the bearings. The closure element can be configured, for example, to fill up this space completely or partially. Alternatively the closure element can also include at least one radial section that extends almost up to the second component or the inner ring of the at least one bearing and delimits a space for the lubricant adjacent to the bearing in the axial direction. This radial section can possibly be disposed only on one axial end or on both axial ends of the closure element. In the axial direction between the two radial sections or outside of the one radial section the closure element can have a diameter such that a spacing arises between the second component and the closure element that corresponds to at least 80%, 90%, 95%, or 99% of a spacing in the axial direction between the second component and the first component outside the opening.

Additionally or alternatively a minimum gap can be present between the closure element and the second component, so that the closure element does not slip on the second component and does not impede a rotational movement by friction. In other words the closure element can be disposed friction-free with respect to the second component.

In other exemplary embodiments the closure element can be disposed or be, for example, in the assembly such that it abuts against the first and against the second component. This can be the case, for example, in exemplary embodiments in which the closure element is introduced in the form of a soft foam, which then hardens, into the opening or the bearing assembly. With a first start-up of the bearing assembly the closure element can then close such that there is no or only acceptable friction with respect to the second component.

Additionally or alternatively the closure element can be connected to the first component in a material-bonded manner. In some exemplary embodiments a simple attaching of the component can thereby be made possible. For this purpose the closure element can, for example, be introduced into the opening in liquid or paste form. For example, the closure element can thereby assume the shape of the opening and adhere in the opening. The closure element can possibly be attached to the first component without adhesive, or in a material-bonded manner using additional adhesive.

Additionally or alternatively the closure element can comprise a foamed material. In some exemplary embodiments a weight reduction of the bearing assembly can thereby be achieved. In a cured or dried state the foamed material can be, for example, a solid component that, however, includes pores and air pockets. In a not-yet-cured state, for example, when the foamed material is introduced into the opening, it can be, for example, a formable soft foam, so that the opening is completely filled in. The foamed material can be, for example, a building foam, an assembly foam, for example, made of a plastic, for example, made of polyurethane (PUR), polyvinyl chloride (PVC), polystyrene, or the like.

Additionally or alternatively the closure element can also be connected to the first component in a friction- and/or interference-fit manner. In some exemplary embodiments additional attachment elements can thereby be omitted. For example, when the first component is disposed radially outward, the closure element can have an outer diameter that produces a press-fit with the diameter of a bore in the first component, in which bore the closure element is disposed.

Additionally or alternatively the closure element can be configured as a ring. The ring can be placed, for example, radially outwardly around the component, so that it covers the opening or is inserted radially inwardly into an opening of the component, so that it covers the opening from radially inward. The ring can be manufactured, for example, from a plastic, an elastomer, or a metal, or comprise at least one of these materials.

Additionally or alternatively at least one seat for the closure element can be located outside the opening. For example, the first component can be machined for this purpose. In some exemplary embodiments a better contact surface can be produced for the closure element, for example, when the closure element is attached outside the opening in an interference- or friction-fit manner. Under certain circumstances a seal effect can thereby be improved, for example, in comparison to unprocessed casting surfaces as an abutment surface.

Additionally or alternatively at least one seal can be disposed between the closure element and the first component in the radial direction. In some exemplary embodiments the entry of the lubricant into the opening can thus be reliably prevented or reduced. For example, the seal can also be disposed outside the opening. The seal can be, for example, an elastic component, an O-ring, a seal lacquer, or the like.

The exemplary embodiments and their individual features disclosed in the above description, the following claims, and the accompanying Figures can be meaningful and implemented both individually and in any combination for the realization of an exemplary embodiment in its various designs. The Figures thus schematically show the following views.

DETAILED DESCRIPTION

In the following description of the accompanying Figures, like reference numerals refer to like or comparable components. Furthermore, summarizing reference numbers are used for components and objects that appear multiple times in an exemplary embodiment or in an illustration, but that are described together in terms of one or more common features. Components or objects that are described with the same or summarizing reference numbers can be embodied identically, but also optionally differently, in terms of individual, multiple, or all features, their dimensions, for example, as long as the description does not explicitly or implicitly indicate otherwise.

Figure 1:
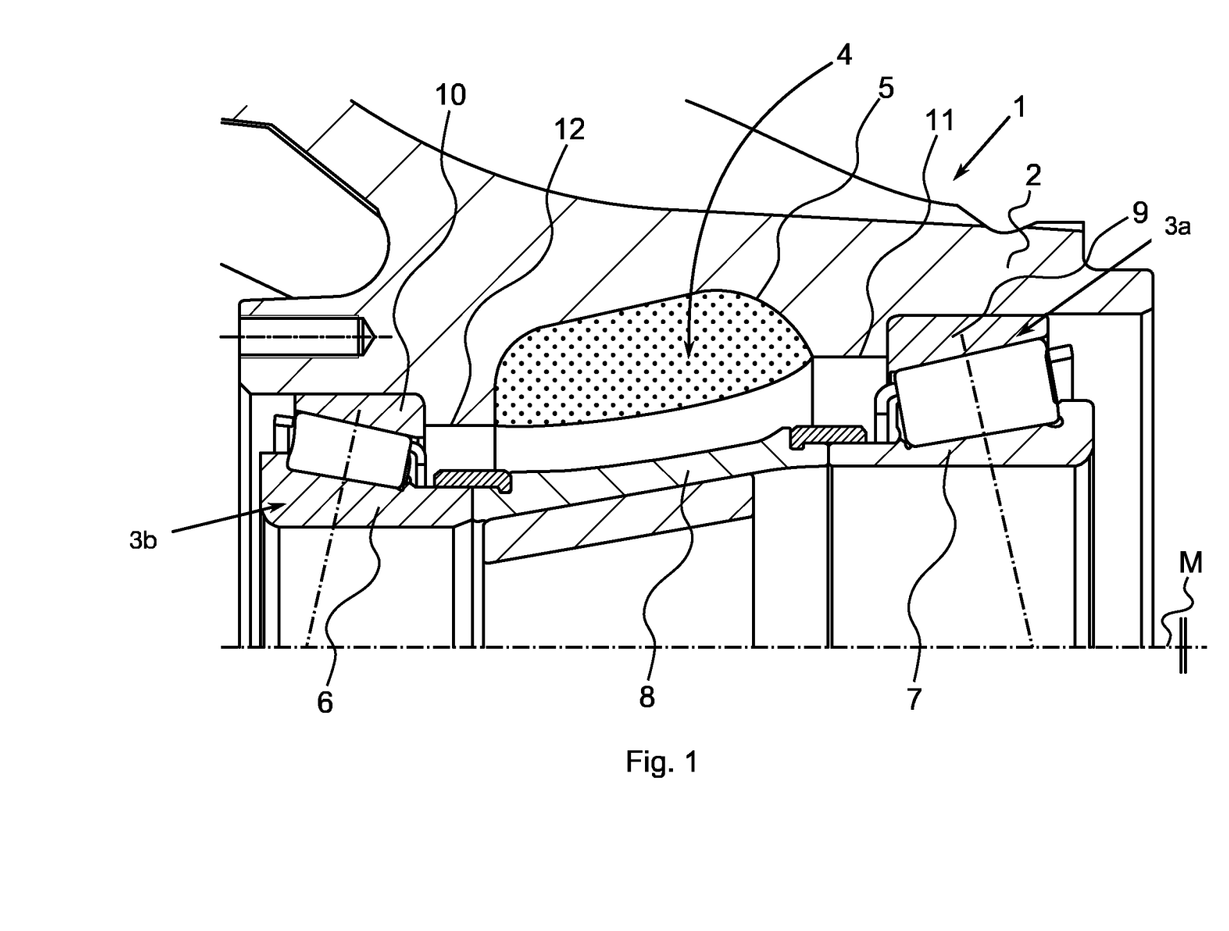
FIG. 1 is a schematic sectional view of a bearing assembly according to a first exemplary embodiment.

FIG. 1 shows a schematic representation of a cut view of a bearing assembly 1 according to a first exemplary embodiment. The bearing assembly 1 is configured to rotatably support a first component 2 with respect to a not-depicted second component. The second component can be, for example, a shaft that is disposed radially inside the first component 2. For this purpose the bearing assembly 1 includes at least one bearing 3a and a closure element 4. The closure element 4 is configured to close an opening 5 in the first component, which opening 5 is disposed adjacent to the bearing 3a in axial direction M. An opening that is disposed adjacent to the bearing in the axial direction is disposed, for example, free of overlap with respect to the bearing in the axial direction.

The first component 2 is a wheel hub, and the bearing assembly 1 is a wheel bearing assembly. The second not-depicted component is an axle. In some further, not-shown exemplary embodiments the first component can also be any other component, for example, a housing, a shaft, or the like. The first component 2 is manufactured as a cast part. In other exemplary embodiments the first component can also include other materials, for example, plastic, aluminum, steel, or the like, and/or be manufactured by other manufacturing methods, for example, forging or machining.

The opening 5 is an undercut or a cavity that is disposed to optimize the weight of the first component 2. For this purpose the opening 5 is configured as a groove encircling in the circumferential direction. The opening 5 has a greater extension in the axial direction than the bearing 3a. In other not-shown exemplary embodiments the opening can have at least one extension in the axial direction that corresponds to 10%, 15%, 20%, 30%, 40%, 50%, 60%, 100%, 150%, or 200% of an axial extension of the bearing 3a. The opening 5 is bounded in the radial direction by a material of the component 2. Here the opening 5 has an extension in the radial direction that corresponds to at most one half of a material thickness in the radial direction of the first component 2. In other exemplary embodiments this proportion can also be larger.

The bearing assembly 1 includes a second bearing 3b. In the following the bearing 3a is therefore referred to as first bearing 3a. The two bearings 3a and 3b are each tapered roller bearings that are disposed in a back-to-back arrangement with respect to each other. The bearings 3a and 3b have a different diameter. In some further not-shown exemplary embodiments only one bearing can also be provided, or bearings having the same diameter. Tapered roller bearings can be provided, for example, in a face-to-face arrangement, or also other rolling-element bearings, for example, ball bearings, cylindrical roller bearings, needle roller bearings, angular contact ball bearings, or the like. Of these, one bearing or also a pairwise assembly can each be considered. A locating and non-locating bearing assembly can also optionally be selected.

The two bearings 3a and 3b are axially spaced from each other. The opening 5 is located between the two bearings 3a and 3b in the axial direction. The bearings 3a and 3b each include an outer ring 9 and 10. In the first component 2 a bearing seat is respectively provided for the outer rings 9 and 10. The outer rings 9 and 10 are supported in the axial direction on shoulders 11 and 12. Here the shoulders 11 and 12 protrude farther radially inward than other radially inwardly directed surfaces of the first component 2 outside the opening 5. The opening 5 is located between the two shoulders 11 and 12. The bearings 3a and 3b include separate inner rings 6 and 7. The inner rings 6 and 7 are connected to each other via a connecting piece 8. In some further not-shown exemplary embodiments the bearing assembly can also include a common inner ring.

In the exemplary embodiment of FIG. 1 the closure element 4 is a foamed material, for example, a building foam or an assembly foam. The closure element 4 has been manufactured such that the foamed material has been introduced in a liquid state into the opening 5 or the cavity in the hub. The closure element 4 prevents a lubricant or an oil that is used for lubricating the bearings 3a and 3b from reaching into the cavity 5 such that it is no longer available for lubricating the bearings 3a and 3b. In comparison to other bearing assemblies it can thus be sufficient to introduce a smaller amount of lubricant, since a space that the lubricant could otherwise occupy is occupied by the closure element 4.

The closure element 4 can be manufactured, for example, from a material, or comprise such a material, that has a lower density than a material of the first component, for example, plastic, rubber, metal, or the like. For this purpose the material can be present as foam, i.e., include a plurality of pores, for example such that a total volume of the pores corresponds to at least 20%, 30%, 40%, 50% of a total volume of the closure element. Alternatively the closure element can also be manufactured from a solid material, i.e., it can be pore free.

The closure element 4 is connected to the first component 2 in a material-bonded manner. For this purpose the closure element 4 is only in contact with a surface of the first component 2, which surface is located inside the opening 5. The shoulders 12 and 11 or their radially inwardly directed surfaces are free of the material of the closure element 4. In other words the closure element 4 terminates flush with a radially inwardly directed surface of the component 2 or the shoulders 11 and 12. In other not-shown exemplary embodiments the closure element can also be located on these shoulders.

Figure 2:
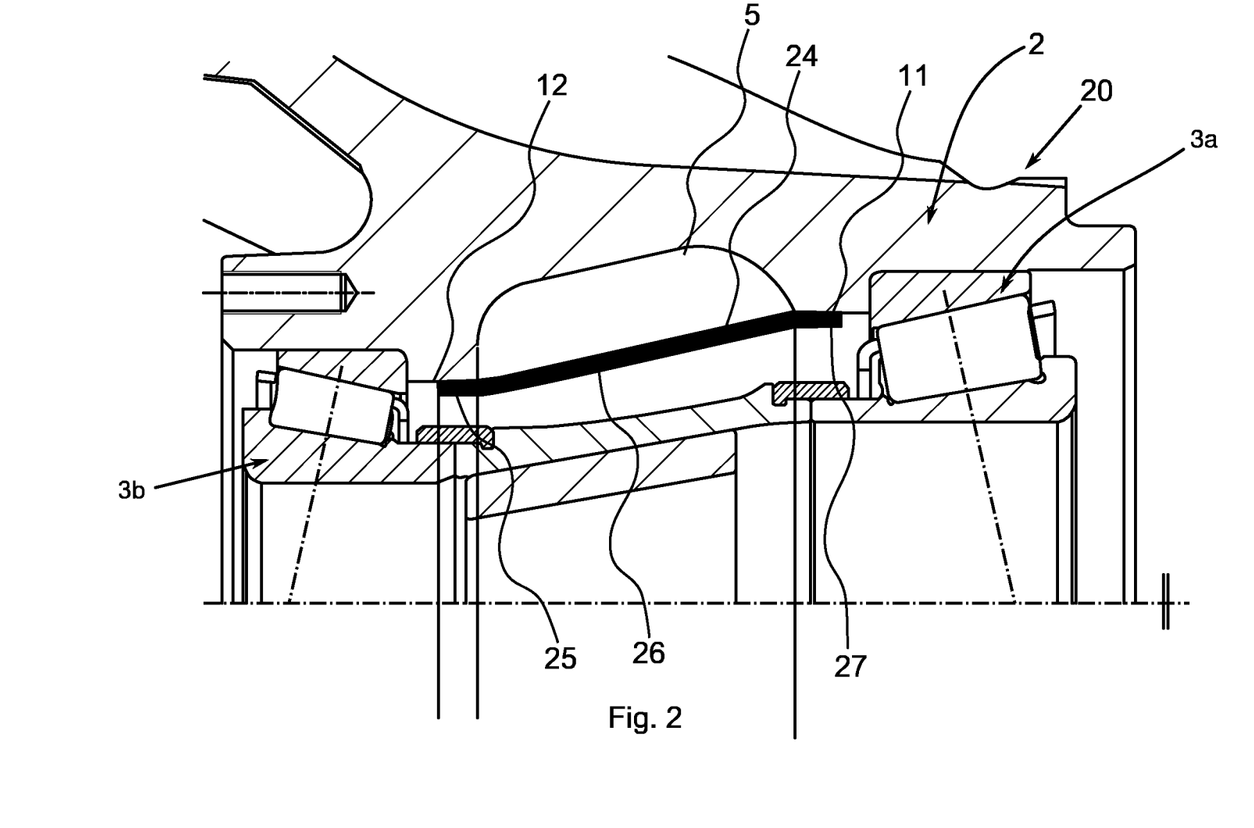
FIG. 2 is a schematic sectional view of a bearing assembly according to a further exemplary embodiment.

FIG. 2 shows a schematic representation of a cut view of a bearing assembly 20 according to a further exemplary embodiment. The bearing assembly 20 of the exemplary embodiment of FIG. 2 is essentially similar to the bearing assembly 1 of the exemplary embodiment of FIG. 1 and differs by a closure element 24. Therefore in the following only differences are described. Identical or similar components are therefore referred to by identical reference numbers.

In the exemplary embodiment of FIG. 2 the closure element 24 is configured as a closed ring that can also be referred to as a sleeve or as an annular component. The closure element 24 has a wall thickness that corresponds to at most $\frac{1}{10}$ or $\frac{1}{20}$ of a largest diameter of the closure element 24. The closure element 24 is configured compact and pore-free. As material the closure element 24 can include a plastic, a metal, and/or an elastomer. The closure element 24 can possibly also be completely manufactured from one of these materials. The closure element 24 sits on the radially inwardly directed surface of the component 2 in a friction- and/or interference-fit manner. For this purpose the closure element 24 is pressed onto the shoulders 11 and 12. The closure element 24 has a greater extension in the axial direction than the opening 5. The closure element 24 thereby sealingly abuts against the shoulders 11 and 12 and outside the opening 5 in the axial direction. In the exemplary embodiment of FIG. 2 the opening 5 is present as cavity, but closed.

For this purpose the closure element 24 has a shape that corresponds to an inner contour of the first component 2. In other words the closure element 24 includes three sections 25, 26 and 27. Here the section 25 is cylindrical and has a uniform diameter. Here an outer diameter of the section 25 is configured such that a press-fit arises between an inner diameter of the shoulder 12 and the section 25. In order to provide a better seal, the radially inwardly directed surface of the shoulder 12 can be machined. The closure element 24 is respectively spaced in the axial direction from the outer rings 9 and 10 of the bearings 3a and 3b. Furthermore the closure element 24 also includes a middle section 26. The middle section 26 axially overlaps the opening 5. The section 26 is conical. The section 27, which has a larger diameter than the section 26, connects to the section 26. The section 27 is again configured cylindrical. Here the outer diameter in the section 27 is selected such that a press-fit arises between the radially inwardly directed surface of the shoulder 11 and the section 27. With the section 26 the closure element 24 is disposed spaced from the second component 2.

Figure 3:
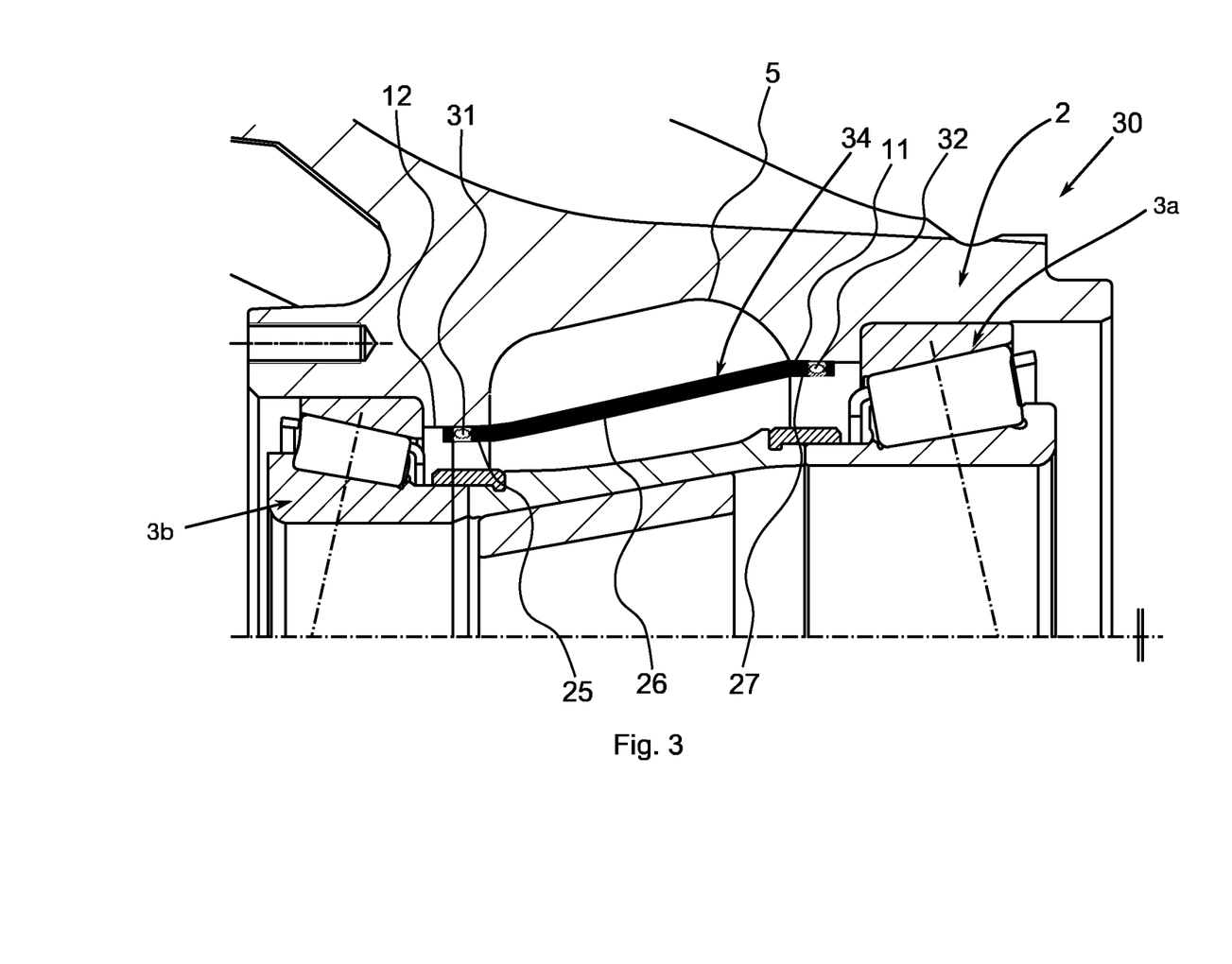
FIG. 3 is a schematic sectional view of a bearing assembly according to a further exemplary embodiment.

FIG. 3 shows a schematic representation of a cut view of a bearing assembly 30 according to a further exemplary embodiment. The bearing assembly 30 is essentially similar to the bearing assemblies 1 and 20 and differs by a closure element 34. The closure element 34 is configured essentially similar to the closure element 24 and also comprises the sections 25, 26, and 27. Therefore in the following only the differences are discussed. In addition to the closure element 34, two seals 31 and 32 are disposed in the bearing assembly 30. Here the seals 31 and 30 are O-rings, for example, made of an elastomer or another elastic material. The seals 30 and 31 are disposed on the shoulders 11 and 12 outside the opening 5 in the axial direction. The section 25 and analogously also the section 27 include a groove encircling in the circumferential direction, wherein the seals 31 or 32 are received. The grooves are opened radially outward and closed radially inwardly by the material of the closure element 34. Here the grooves in the exemplary embodiment of FIG. 3 have a rectangular cross-section, while the seals have round cross-sections. In other words the seals are disposed outside the opening 5 between the closure element 34 and the component 2 in the radial direction. In some further not-shown exemplary embodiments seals or grooves having a different cross-section can also be provided. The grooves can also optionally be omitted. Seals can then nevertheless be disposed or else a seal lacquer can be applied in a material-bonded manner to the closure element and/or to the first component.

In other words some exemplary embodiments relate to bearing assemblies, for example, wheel bearings, having optimized lubrication. In some exemplary embodiments a cavity in a hub can be filled by building foam or assembly foam, for example, polyurethane (PUR), so that no lubricant enters into the cavity. In other exemplary embodiments the cavity can be sealed, for example, by a ring that is pressed onto two hub shoulders on the component including the cavity. In other exemplary embodiments the ring can be sealed. In addition seal elements, for example, O-rings or also a seal lacquer can be provided so that a seal effect between the component and the closure element is strengthened. In some exemplary embodiments it can be achieved by the closure element that the hollow volume of the wheel bearing is reduced and a lubricant quantity or oil quantity can be optimized or reduced. Costs can possibly thereby be reduced, but also frictional torques in operation. In some exemplary embodiments not-shown seals of the bearings can also be better lubricated. Different shapes of the opening, for example, angles or smaller undercuts, can be closed very easily. In some exemplary embodiments an oil loss or an oil quantity can also be optimized during operation. In some exemplary embodiments residue or dirt that is still located in the opening from the hub manufacturing can be prevented from entering into the bearing. In some exemplary embodiments the service life of the bearings and/or the seals can thus be extended.

Figure 4:
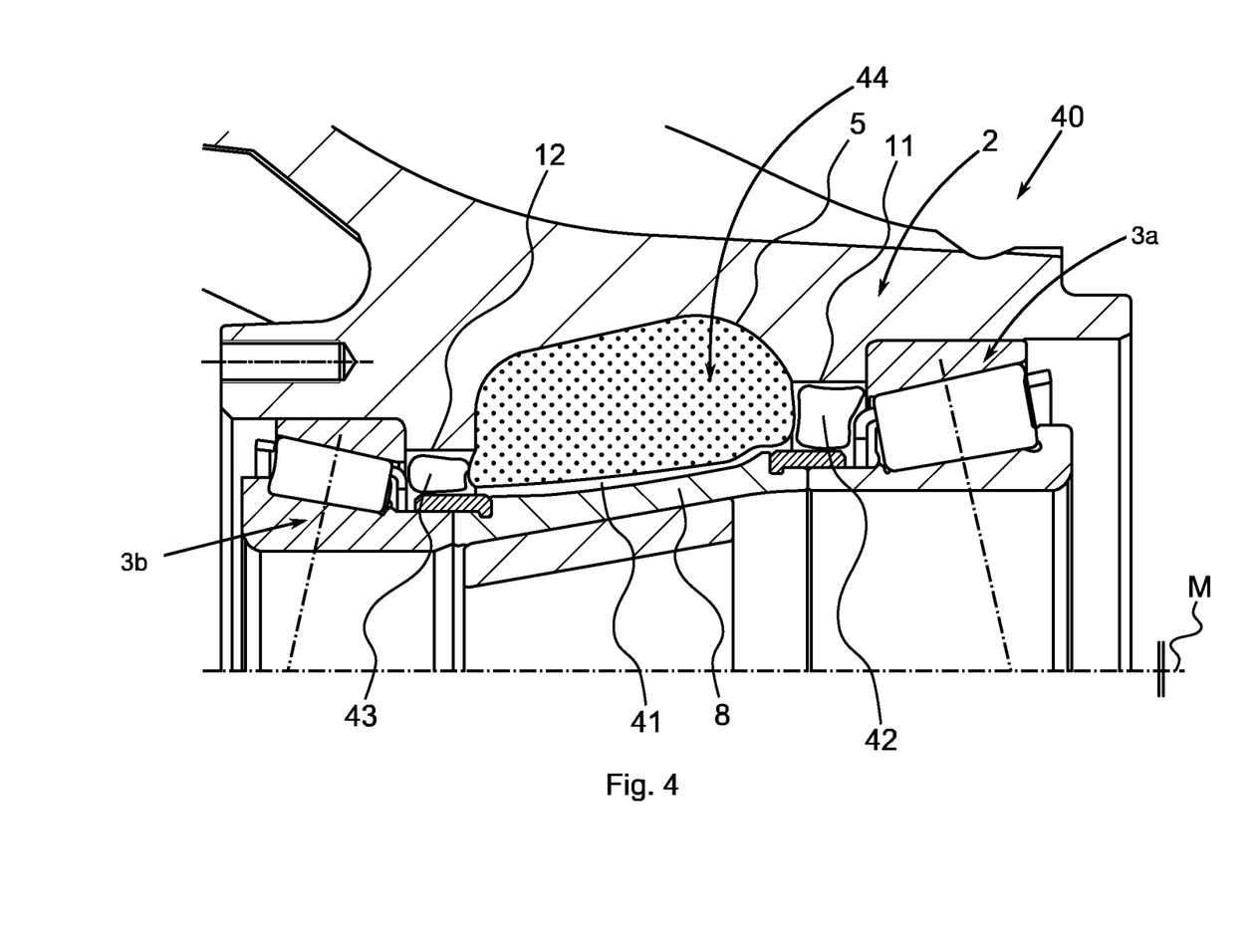
FIG. 4 is a schematic sectional view of a bearing assembly according to a further exemplary embodiment.

FIG. 4 shows a schematic representation of a cut view of a bearing assembly 40 according to a further exemplary embodiment. The bearing assembly 40 is essentially similar to the above-described bearing assemblies 1, 20 or 30 and differs by a closure element 44. The closure element 44 is manufactured similarly to the closure element 4 from a foamed material and connected to the first component 2 in a material-bonded manner. Therefore in the following only differences are described. Identical or similar components are therefore referred to with identical reference numbers. However, the closure element 44 is disposed to delimit a space for a lubricant for lubricating the bearings in the axial direction. For this purpose the closure element 44 has a greater extension in the radial direction than the opening 5. In other words the closure element 44 protrudes radially inward out of the opening 5 in the radial direction over the surfaces of the shoulders 12 and 11. Here a gap 41 arises with respect to the connecting section 8, in other exemplary embodiments possibly also with respect to another component. An extension of the closure element 44 outside the opening 5 is oriented in the axial direction essentially on the axial extension of the opening 5. In some further not-shown exemplary embodiments the closure element can also have a larger or smaller extension in the axial direction than the opening 5, so that sufficiently limited grease-filling spaces arise.

In FIG. 4 schematic filling spaces 42 and 43 are depicted. Here the grease-filling space is a region wherein the grease is to be collected in order to dispense lubricant. Here the grease-filling space 42 is located between the bearing 3 and the closure element 44 or the opening 5 in the axial direction. Here the grease-filling space 43 is located between the bearing 3b and the closure element 44 or the opening 5 in the axial direction. The grease-filling spaces 42 and 43 only have an extension in the axial direction that corresponds to an axial extension of the shoulders 11 and 12. The closure element 44 can thus be used in grease-lubricated bearings. However, a use in oil-lubricated bearings is also conceivable.

Figure 5:
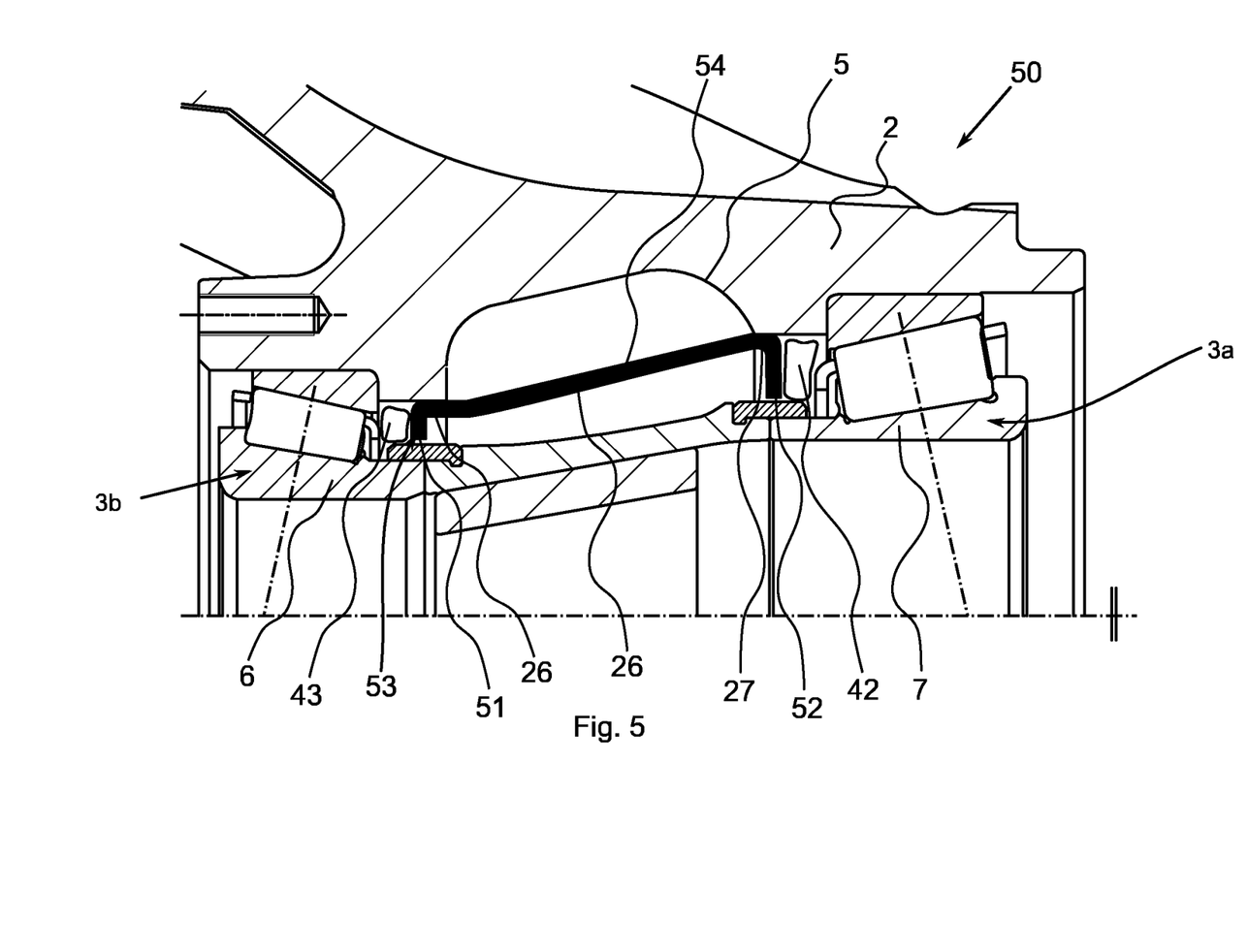
FIG. 5 is a schematic sectional view of a bearing assembly according to a further exemplary embodiment.

FIG. 5 shows a schematic representation of a sectional view of a bearing assembly 50 according to a further exemplary embodiment. The assembly of FIG. 5 is essentially similar to one of the above-described bearing assemblies, but differs by a closure element 54. The closure element 54 is also configured to reduce or to limit grease-filling spaces 42 and 43 in the axial direction. The closure element 54 is configured in a similar manner to the closure element 24 as sleeve or as an annular body. The closure element 54 also includes the sections 25, 26 and 27. Under certain circumstances a seal element, for example, an O-ring or a seal lacquer, can also be disposed between the sections 27 and 26 and the first component 2.

On ends that face the bearings 3a and 3b in the axial direction, the closure element 54 comprises radially inwardly projecting radial sections 51 and 52. The radial sections 51 and 52 project further radially inward than the sections 26 to 27. The radial sections 51 and 52 are spaced from the second not-shown component or from the inner rings 6 and 7 of the bearing assembly 50 only by a small gap 53. Since the closure element 54 includes the radial sections 51 and 52, a migration of the grease into a region that overlaps with the opening 5 in the axial direction can be avoided or at least reduced.

The exemplary embodiments of FIGS. 4 and 5 can be interesting, for example, for wheel bearings having grease lubrication. In other words they can be wheel bearing assemblies having optimized grease lubrication. In these exemplary embodiments, under certain circumstances wheel bearings or hubs that include the cavities and undercuts in order to optimize the weight of the wheel bearings or hub, can be correspondingly adapted for lubricant or grease filling. In some exemplary embodiments the cavity in the hub is filled in by building-foam- or assembly-foam-filling, and the two bearings 3a and 3b are delimited or separated from each other in the axial direction so that only a minimal gap is present in the axial direction between the closure element or the building foam and a bearing inner ring. In the axial direction the gap can have, for example, an extension of at most 1%, 2%, 3%, 5%, 6%, 10%, or 15% of a pitch circle diameter of a bearing of the bearing assembly. These can be, for example, the smallest pitch circle diameter.

In other exemplary embodiments the cavity can be sealed by a plastic, metal, and/or elastomer sleeve or ring. The sleeve or the ring is pressed onto two hub shoulders. The two bearing assemblies are also thereby separated from each other such that a minimum gap arises between the opening and the intermediate sleeve or the bearing inner rings. In some exemplary embodiments the grease volume adjacent to the bearing can be precisely defined. A grease quantity can thus be optimized and reduced, for example. Due to the limiting the grease can be held in the bearing during the running time, for example, and a migration can be prevented.

However, the bearing assemblies of the Figures can be used not only in wheel bearings as described for the Figures, but, for example, also in transmissions, for example, axle transmissions, or all other possible bearing assemblies, for example, in vehicles, transport devices, machine tools, or the like.

The exemplary embodiments and their individual features disclosed in the above description, the following claims, and the accompanying Figures can be meaningful and implemented both individually and in any combination for the realization of an exemplary embodiment in its various designs. In some further exemplary embodiments, features that are disclosed in other exemplary embodiments as device features can also be implemented as method features. Furthermore, features that are implemented in some exemplary embodiments as method features can also optionally be implemented in other exemplary embodiments as device features.

REFERENCE NUMBER LIST

1 Bearing assembly
2 First component
3 Bearing
4 Closure element
5 Opening
6 Inner ring
7 Inner ring
8 Connecting piece
9 Outer ring
10 Outer ring
11 Shoulder
12 Shoulder
20 Bearing assembly
24 Closure element
25 Section
26 Section
27 Section
30 Bearing assembly
31 Seal
32 Seal
34 Closure element
40 Bearing assembly
41 Gap
42 Grease-filling space
43 Grease-filling space
44 Closure element
50 Bearing assembly
51 Radial section
52 Radial section
53 Gap
54 Closure element
M Axis of rotation

What is claimed is:

1. A bearing assembly configured to rotationally support a first component relative to a second component, the bearing assembly comprising:
   at least one bearing; and
   at least one closure element configured to close an opening in the first component,
   wherein the opening is disposed axially adjacent to the bearing, and
   wherein the closure element has a radially directed surface that is flush with a surface of the first component on which the opening is located.

2. The bearing assembly according to claim 1, further comprising a second bearing, wherein the opening is disposed axially between the first bearing and the second bearing.

3. The bearing assembly according to claim 1, wherein the first component is a cast component.

4. The bearing assembly according to claim 1, wherein the first component is a wheel hub and/or the second component is an axle.

5. The bearing assembly according to claim 1, wherein the closure element is configured to at least partially delimit in an axial direction a space for a lubricant.

6. The bearing assembly according to claim 1, wherein the closure element is connected to the first component in a material-bonded manner.

7. The bearing assembly according to claim 1, wherein the closure element comprises a foamed material.

8. The bearing assembly according to claim 1, wherein the closure element is connected to the first component in a friction- and/or interference-fit manner.

9. The bearing assembly according to claim 8, wherein the closure element comprises a ring.

10. The bearing assembly according to claim 1, wherein at least one seal is disposed between the closure element and the first component in a radial direction.

11. The bearing assembly according to claim 1, including the first component.

12. The bearing assembly according to claim 11, wherein the first closure element comprises a foam body cured in place in the opening such that the foam body conforms to a shape of the opening.

13. The bearing assembly according to claim 12, wherein the cured foam body comprises polyurethane or polyvinylchloride or polystyrene.

14. The bearing assembly according to claim 13,
wherein the opening is disposed axially between the first bearing and a second bearing, and
wherein the first component is a cast wheel hub.

15. The bearing assembly according to claim 12,
wherein the foam body has a surface that projects radially inward from an interior surface of the first component.

16. The bearing assembly according to claim 11, wherein the closure element comprises a ring mounted in the first component such that it covers the opening.

* * * * *